(12) United States Patent
Pape

(10) Patent No.: US 11,797,008 B2
(45) Date of Patent: Oct. 24, 2023

(54) OBSTACLE AVOIDANCE SYSTEM FOR A CAMERA ARM FOR OBSERVING TRAFFIC TO THE REAR OF A VEHICLE

(71) Applicant: Continental Automotive gmbH, Hannover (DE)

(72) Inventor: Lukas Pape, Munich (DE)

(73) Assignee: CONTINENTAL AUTOMOTIVE GMBH, Hannover (DE)

(*) Notice: Subject to any disclaimer, the term of this patent is extended or adjusted under 35 U.S.C. 154(b) by 353 days.

(21) Appl. No.: 17/010,566

(22) Filed: Sep. 2, 2020

(65) Prior Publication Data
US 2021/0072753 A1 Mar. 11, 2021

(30) Foreign Application Priority Data
Sep. 5, 2019 (DE) ..................... 10 2019 213 525.0

(51) Int. Cl.
| G05D 1/00 | (2006.01) |
| H04N 5/232 | (2006.01) |
| B60R 11/04 | (2006.01) |
| H04N 5/225 | (2006.01) |
| H04N 23/54 | (2023.01) |
| H04N 23/695 | (2023.01) |

(52) U.S. Cl.
CPC ............ G05D 1/0094 (2013.01); B60R 11/04 (2013.01); H04N 23/54 (2023.01); H04N 23/695 (2023.01)

(58) Field of Classification Search
CPC .......................... B60R 11/04; B60R 2011/004
See application file for complete search history.

(56) References Cited

U.S. PATENT DOCUMENTS

| 5,473,364 A * | 12/1995 | Burt ................. G08B 13/19602 348/E7.086 |
| 2004/0041942 A1* | 3/2004 | Jones ........................ B60R 1/00 348/373 |
| 2016/0096488 A1* | 4/2016 | Poliquin ................. B60R 11/04 348/148 |
| 2016/0127643 A1* | 5/2016 | Huerta ................. H04N 5/2252 439/8 |

(Continued)

FOREIGN PATENT DOCUMENTS

| CN | 103359004 | 10/2013 |
| CN | 104477081 A * | 4/2015 |

(Continued)

OTHER PUBLICATIONS

Office Action dated Apr. 6, 2021 issued in Sweden Patent Application No. 2051025-1.

(Continued)

*Primary Examiner* — Jelani A Smith
*Assistant Examiner* — Jacob Daniel Underbakke
(74) *Attorney, Agent, or Firm* — Cozen O'Connor

(57) ABSTRACT

An obstacle avoidance system for a camera arm configured to observe traffic to the rear of a vehicle, the vehicle having bodywork, includes: the camera arm having a camera; and a guide configured so as to extend from a lateral surface of the bodywork of the vehicle to a roof surface of the bodywork of the vehicle. The camera arm is arranged on the guide so as to be slidable along the guide back and forth between a position of rest on the roof surface and a working position on the lateral surface.

10 Claims, 2 Drawing Sheets

(56) References Cited

U.S. PATENT DOCUMENTS

2016/0375829 A1    12/2016  Lang et al.
2019/0118728 A1*   4/2019   Oba .......................... B60R 1/00
2019/0132497 A1    5/2019   Lang et al.

FOREIGN PATENT DOCUMENTS

| CN | 109862220 A | * | 6/2019 | |
|---|---|---|---|---|
| CN | 110182027 A | * | 8/2019 | |
| DE | 10 2011 113323 | | 5/2012 | |
| DE | 10 2012015 395 | | 11/2013 | |
| DE | 102016209927 | | 12/2017 | |
| DE | 20 2017 103443 | | 9/2018 | |
| EP | 2 955 065 | | 12/2015 | |
| EP | 3 248 842 | | 11/2017 | |
| EP | 3415371 | | 12/2018 | |
| EP | 3 476 654 | | 5/2019 | |
| KR | 20180102464 A | * | 9/2018 | |
| KR | 20190057707 A | * | 5/2019 | |
| WO | WO 2017/178859 | | 10/2017 | |
| WO | WO-2018100168 A1 | * | 6/2018 | |
| WO | WO 2019/106398 | | 6/2019 | |
| WO | WO-2019106398 A1 | * | 6/2019 | ............... B60R 1/00 |

OTHER PUBLICATIONS

Search Report and Written Opinion dated Mar. 2, 2021 issued in Dutch Patent Application No. 2026352.

* cited by examiner

OBSTACLE AVOIDANCE SYSTEM FOR A CAMERA ARM FOR OBSERVING TRAFFIC TO THE REAR OF A VEHICLE

BACKGROUND OF THE INVENTION

1. Field of the Invention

The present invention relates to an obstacle avoidance system for a camera arm for observing traffic to the rear of a vehicle, and to a vehicle having the obstacle avoidance system.

2. Description of the Related Art

Contemporary vehicles have classic rearview mirrors with a reflective surface in order to ensure visibility to the rear of the vehicle.

Since rearview mirrors are also mounted, inter alia, in the external region and have relatively large dimensions, they result in a comparatively high wind resistance. Furthermore, the visibility to the rear can be adversely affected by external influences such as rain and dirt on the side windows and the mirror. In addition, the classic mirror principle is not suitable for carrying out additional intelligent functions.

Digital camera arms can replace the classic rearview mirror. The digital camera arm has for this purpose a camera that records images of the area to be monitored to the rear of the vehicle and makes these images available to the driver, in particular, via a display device.

However, the camera arm undesirably blocks the driver's view in various driving situations. In addition, the camera arm on the outside of the vehicle is frequently subjected to mechanical loading such as, for example, a collision.

SUMMARY OF THE INVENTION

An object of the present invention is to provide an improved obstacle avoidance system for a camera arm for observing traffic to the rear of a vehicle.

This object may be achieved by, according to one aspect, an obstacle avoidance system for a camera arm for observing traffic to the rear of a vehicle, the system comprising the camera arm having a camera, a guide extending from a lateral surface of the bodywork of the vehicle to a roof surface of the bodywork of the vehicle, wherein the camera arm is arranged on the guide so as to be slidable along the guide from a position of rest on the roof surface to a working position on the lateral surface and vice versa.

The guide preferably runs over the curvature of the bodywork of the vehicle, in particular over the curvature of the bodywork from the lateral surface to the roof surface of the vehicle.

The camera arm preferably runs from the working position to the position of rest and vice versa along a cycloidal path.

The camera arm preferably comprises a rod-shaped projection, wherein the camera is also preferably arranged at an end furthest away from the vehicle.

The camera arm is preferably configured to hold and/or position the camera. Furthermore, the camera arm is configured to protect the camera, in particular from external environmental influences. The protective function of the camera arm with respect to the camera relates preferably to protection against a mechanical effect such as a mechanical shock or shock loading from a horizontal and/or lateral direction; in other words, against a mechanical effect from the front, from the rear and/or from the side of the vehicle.

In this way, a classic rearview mirror of a vehicle can be improved by an improved obstacle avoidance system for a camera arm.

The camera arm therefore preferably avoids mechanical influences that occur to the side of the vehicle, in particular to the side of a driver's cab of the vehicle.

In this way, an improved obstacle avoidance system for a camera arm for observing traffic to the rear of a vehicle is provided.

In one preferred embodiment, the obstacle avoidance system for a camera arm comprises a sliding device slide ("slide") connected to the camera arm and arranged on the guide so as to be slidable along the guide.

The slide and the guide are preferably embodied such that the slide slide can slide over the guide.

In this way, an improved obstacle avoidance system for a camera arm for observing traffic to the rear of a vehicle is provided.

In one preferred embodiment, the guide has at least one first guide rail and a control cam, wherein the first guide rail is configured to guide the camera arm along the guide, and the control cam is configured to control an alignment of the camera arm along the guide rail.

The first guide rail and the control cam are preferably arranged parallel to one another in a direction of travel of the vehicle.

The guide preferably has a first guide rail and a second guide rail, wherein the control cam is arranged between the first guide rail and the second guide rail.

In this way, an improved obstacle avoidance system for a camera arm for observing traffic to the rear of a vehicle is provided.

In one preferred embodiment, the slide has a bearing point on which the camera arm is rotatably mounted at a first connecting point of the camera arm.

In this way, the orientation of the camera arm with respect to the slide, and therefore with respect to the vehicle, can be changed.

In this way, an improved obstacle avoidance system for a camera arm for observing traffic to the rear of a vehicle is provided.

In one preferred embodiment, the obstacle avoidance system for a camera arm comprises a rider arranged on the control cam, wherein the slide has a puller mechanism ("puller") that connects the at least one rider to the camera arm at a second connecting point of the camera arm via a deflection point arranged on the slide.

In this way, the distance of the rider from the vehicle directly influences the orientation of the camera arm.

The first connecting point and the second connecting point are preferably located at two corners of the camera arm. This can ensure that in every position the camera arm is arranged horizontally on the guide with respect to the vehicle.

In this way, an improved obstacle avoidance system for a camera arm for observing traffic to the rear of a vehicle is provided.

In one preferred embodiment, the distance between the control cam and the vehicle varies over the length of the guide rail.

In this way, the rider is arranged closer to or further away from the vehicle, depending on where the rider is located on the control cam. The rider is preferably arranged closer to the vehicle when the slide is in the working position than when the slide is in the position of rest. Conversely, the rider is preferably arranged further away from the vehicle when the slide is in the position of rest than when the slide is in the working position.

In this way, the puller mechanism (puller) is tensioned or relieved of tension and the camera arm is thus influenced in its orientation. Depending on the configuration of the control cam and therefore on a progression of the distance of the control cam from the vehicle, a different orientation of the camera arm is produced during the sliding of the camera arm on the guide rails.

Depending on the configuration of the control cam, a different orientation of the camera arm is produced in accordance with the position of the slide on the guide. Basically, different obstacle avoidance maneuvers of the camera arm are possible. The camera arm preferably always has a horizontal position.

Therefore, the control cam can be configured in such a way that, in the position of rest, the camera arm is placed flat against the vehicle, and, in the working position, the camera arm projects perpendicularly from the vehicle.

The distance of the rider from the vehicle therefore varies. In particular, the distance of the rider from the vehicle varies along the control cam.

In this way, an improved obstacle avoidance system for a camera arm for observing traffic to the rear of a vehicle is provided.

In one preferred embodiment, the slide has an opening in which the rider is movably arranged.

The rider is preferably arranged within the opening and not directly with the slide. The rider is instead held in the opening by the pulling mechanism (puller).

In this way, an improved obstacle avoidance system for a camera arm for observing traffic to the rear of a vehicle is provided.

In one preferred embodiment, the obstacle avoidance system for a camera arm comprises a stop having a latch, wherein, in the working position, the camera arm bears against the stop and is fastened to the stop by the latch.

In this way, an improved obstacle avoidance system for a camera arm for observing traffic to the rear of a vehicle is provided.

In one preferred embodiment, the obstacle avoidance system for a camera arm comprises at least one surroundings sensor configured to determine surroundings data which relate to the surroundings of the vehicle, a drive device configured to move the slide along the guide, and a controller configured (e.g., programmed) to control the drive device in accordance with the determined surroundings data in such a way that the slide is moved along the guide.

The surroundings data preferably include obstacles in the vicinity of the vehicle, in particular to the sides of the vehicle.

The camera arm is preferably configured to hold and/or position the at least one surroundings sensor. Furthermore, the camera arm is configured to protect the at least one surroundings sensor, in particular from external environmental influences.

The surroundings sensor preferably comprises a proximity sensor, a thermometer and/or a moisture sensor.

According to one aspect, a vehicle having an obstacle avoidance system for a camera arm, such as is described here, is provided.

The vehicle is preferably a vehicle which drives in an at least partially automated fashion.

The appended drawings are intended to convey further understanding of the embodiments of the invention. The appended drawings illustrate embodiments and serve, in conjunction with the description, to clarify concepts of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Other embodiments and many of the specified advantages become apparent with regard to the drawings. The illustrated elements of the drawings are not necessarily shown true to scale with respect to one another.

In the drawings.

DETAILED DESCRIPTION OF THE PRESENTLY PREFERRED EMBODIMENTS

Figure 1:
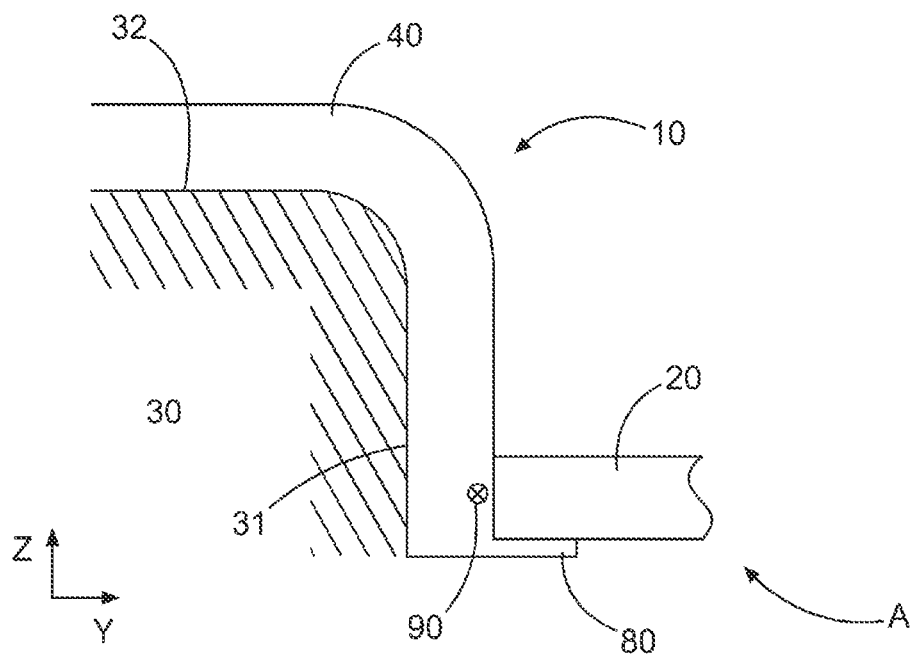
FIG. 1 shows a side view of the obstacle avoidance system for a camera arm in the working position.

FIG. 1 shows an obstacle avoidance system 10 for a camera arm 20. The obstacle avoidance system 10 comprises a camera arm 20 which is attached to a vehicle 30 via a guide 40. The vehicle 30 has a lateral surface 31 and a roof surface 32. The guide 40 extends along the bodywork of the vehicle 30 over the lateral surface 31 to the roof surface 32. The camera arm 20 is arranged on the guide 40 so as to be slidable along the guide 40. The camera arm 20 is configured to accommodate a camera which acts as a digital side mirror for the vehicle. If the camera arm 20 is arranged at the end of the guide 40 on the lateral surface 31 of the vehicle 30, the camera arm 20 is in a working position A. In the working position A, the camera arm 20 and the camera arranged on the camera arm 20 are therefore arranged on the lateral surface 31 of the vehicle 30. In the working position A, the camera arm 20 extends in a horizontal direction Y and therefore projects laterally from the vehicle 30. In the working position A, the camera arm 20 assumes a position on the vehicle 30 which is customary for a side mirror. The guide 40 has a stop 80 on its end which is on the lateral surface 31. The stop 80 limits the sliding capacity of the camera arm 20 in a vertical direction Z along the guide 40. In other words, the camera arm 20 is in the working position A when the camera arm 20 bears against the stop 80. In order to secure the camera arm 20 in the working position A on the guide 40, the camera arm 20 has, at its laterally arranged end, a latch 90 which is configured to latch the camera arm 20 against the guide 40 in the working position A.

The camera arm 20 is slidably arranged on the guide 40 such that it can be slid from the working position A along the lateral surface 31 in the vertical direction Z over the curvature of the bodywork of the vehicle 30 onto the roof surface 32 of the vehicle 30, and from there counter to the horizontal direction Y on the roof surface 32 of the vehicle 30 in the direction of the center of the vehicle 30.

Figure 2:
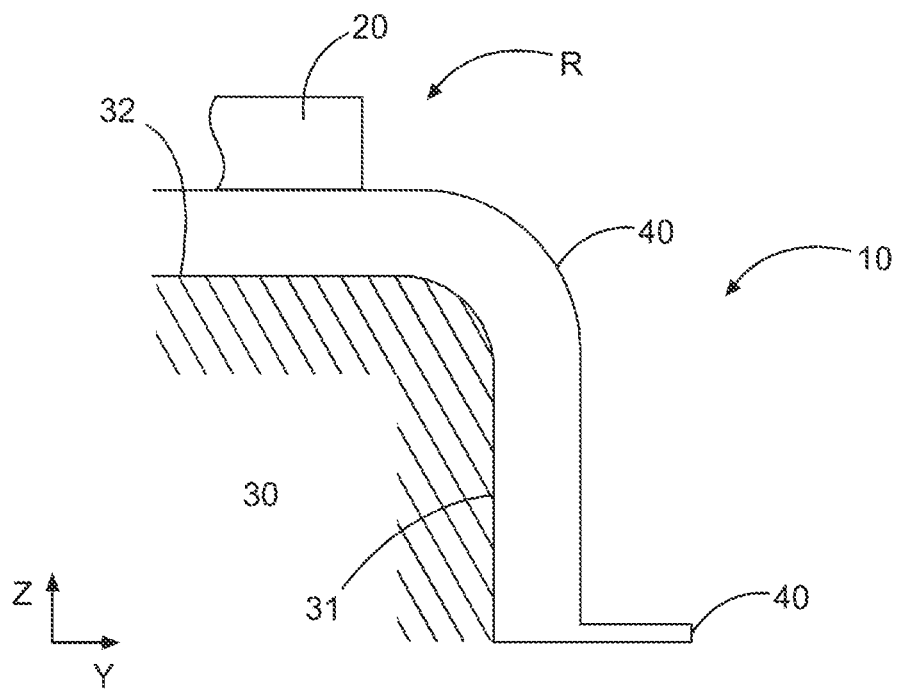
FIG. 2 shows a side view of the obstacle avoidance system for a camera arm in the position of rest.

FIG. 2 shows the obstacle avoidance system 10. In contrast to FIG. 1, the camera arm 20 is now in the position of rest R instead of in the working position A. If the camera arm 20 is arranged on the roof surface 32 of the vehicle 30, it is located in what is referred to as the position of rest R. Although the camera arranged on the camera arm 20 can also capture traffic to the rear of the vehicle 30 in the position of rest R, the function of the camera in the position of rest R is not usually used as a rearview mirror and/or side mirror.

The camera arranged on the camera arm 20 is intended to be spaced apart from the vehicle 30 in the working position A, to be able to carry out the function as a digital side mirror. In other words, the camera must be spaced apart laterally from the vehicle 30 so that the camera assumes a sufficient viewing angle with respect to the traffic to the rear of the vehicle 30. The camera arm 20 is therefore embodied as a rod-like projection which, in the working position A, extends laterally outward from the lateral surface 31 of the vehicle 30. As can be seen in FIG. 2, in the position of rest R on the roof surface 32 of the vehicle 30, the camera arm 20 does not extend in the vertical direction Z from the vehicle 30. Instead, the camera arm 20 rests as flat as possible on the roof surface 32 of the vehicle 30 and extends in the horizontal direction Y. In this way, in the position of rest R, the camera arm 20 offers as little air resistance as possible in the direction of travel X. To do this, the camera arm 20 changes its orientation with respect to the guide 40 on the path from the working position A to the position of rest R. In other words, the camera arm 20 is pivoted with respect to the guide 40, while the camera arm 20 is slid from the working position A to the position of rest R. In this case, the camera arm 20 is pivoted through 90° with respect to the guide 40, between the working position A and the position of rest R. In this way, the camera arm 20 does not change its horizontal orientation along the horizontal direction Y while the camera arm 20 is moving between the working position A and the position of rest R.

Figure 3:
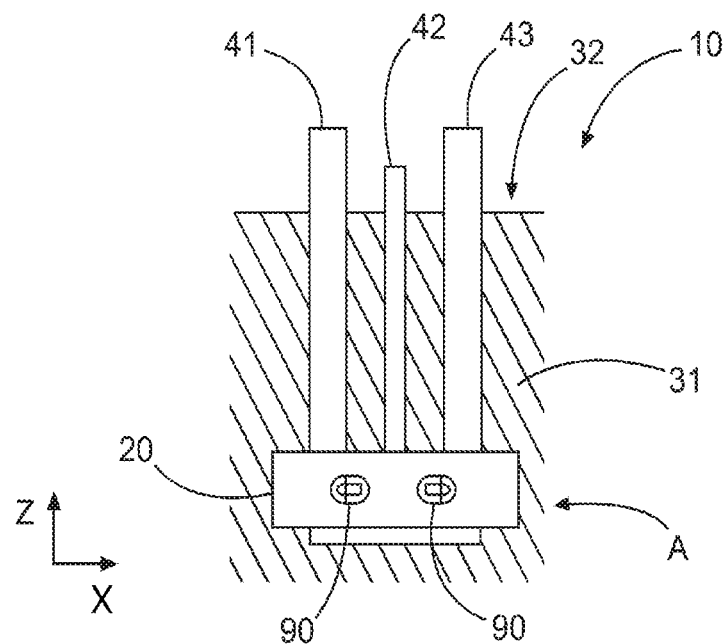
FIG. 3 shows a front view of the obstacle avoidance system for a camera arm in the position of rest.

FIG. 3 shows the obstacle avoidance system 10 as it can be seen from the horizontal direction Y. The guide 40 comprises a first guide rail 41 and a second guide rail 43 which extend parallel to one another in the direction of travel X, from the lateral surface 32 of the vehicle 30 to the roof surface 31 of the vehicle 30. Furthermore, the guide 40 has a control cam 42 which runs between the first guide rail 41 and the second guide rail 43. The camera arm 20 is in the working position A and is fastened in the working position A by the latch 90. The control cam 42 is configured to rotate the camera arm 20 along the guide 40 with respect to the guide 40 such that the horizontal orientation of the camera arm 20 in the horizontal direction Y does not change.

Figure 4:
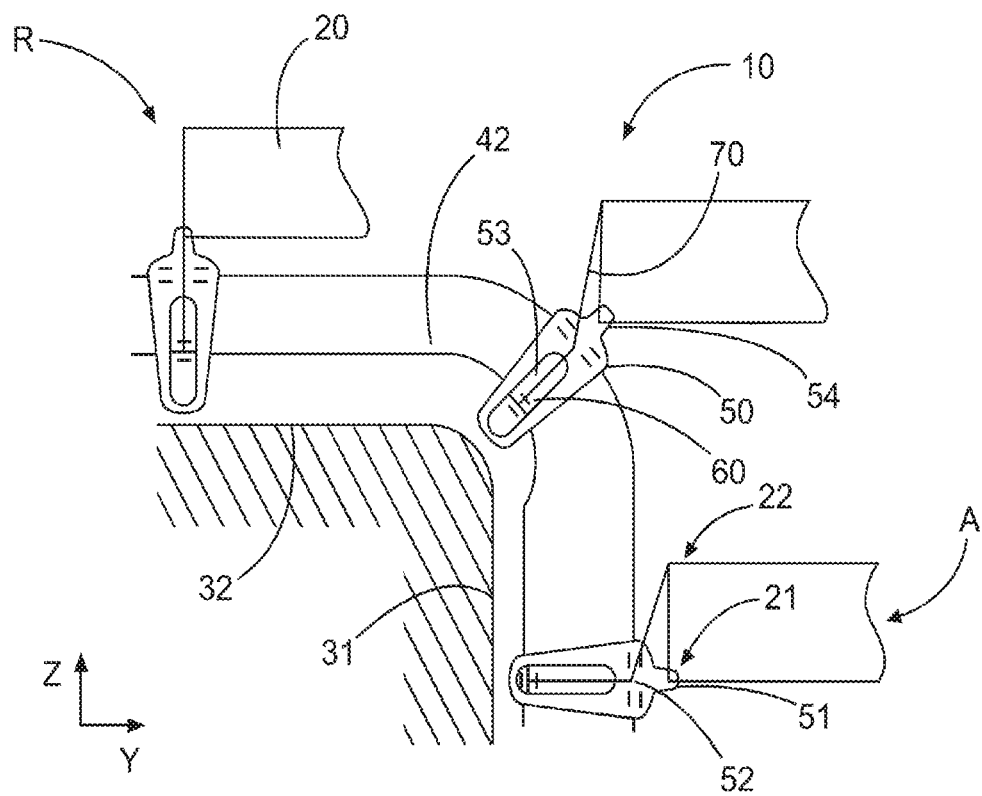
FIG. 4 shows a side view of a progression of the camera arm from the position of rest to the working position.

FIG. 4 shows a more detailed view of the obstacle avoidance system 10. The obstacle avoidance system 10 has a slide 50 connected to the camera arm 20 and arranged on the guide 40 so as to be slidable along the guide 40. In this way, the camera arm 20 can be slid on the guide 40 by the slide 50. The slide 50 has a projection 54 which extends from the slide 50, away from the vehicle 30. A bearing point 51, on which the camera arm 20 is rotatably mounted, is arranged on the projection 54. For this purpose, the camera arm 20 has a fixed connecting point 21.

Since the guide 40 extends from the lateral surface 31 of the vehicle 30 onto the roof surface 32 of the vehicle 30, the orientation of the slide 50 changes from a horizontal orientation in the working position A to a vertical orientation in the position of rest R. So that the camera arm 20 does not change its horizontal orientation during the sliding from the working position A to the position of rest R, the orientation of the camera arm 20 during the sliding with respect to the slide 50 has to change in accordance with the sliding.

For this purpose, the obstacle avoidance system 10 has a puller 70 which is preferably embodied as a cable. The puller 70 is fastened to a second connecting point 22 of the camera arm 20. The first connecting point 21 and the second connecting point 22 are selected in such a way that, in every position of the camera arm 20 in a vertical direction Z on the guide 40, they are arranged in a line along the vertical direction Z. The puller 70 is configured in such a way that it controls the distance between the second connecting point 22 and the vehicle 30. For this purpose, the puller 70 connects the second connecting point 22 to the control cam 42 via a rider 60. A progression of the control cam 42 with respect to the distance from the vehicle 30 therefore also influences the distance between the second connecting point 22 and the vehicle 30. The control cam 42 is embodied in such a way that the distance from the lateral surface 31 is shorter than the distance from the roof surface 32. The puller 70 is deflected from a direction along the slide 50 to the second connecting point 22 by a deflection point 52 on the slide 50. In this way, the puller 70 does not exert any force on the second connecting point 22 when the slide 50, and therefore the camera arm 20, are in the position of rest R. When the camera arm 20 slides along the guide 40 in the direction of the working position A, the control cam 42 changes such that the distance between the control cam 42, and therefore the rider 60 guided thereon, on the one hand, and the vehicle 30, on the other, is reduced, and the puller 70 therefore exerts a force on the second connecting point 22, in the direction of the vehicle 30. This ensures that the camera arm 20 constantly maintains its horizontal orientation in the horizontal direction Y along the guide 40.

For free movement of the rider 60 toward or away from the vehicle 30, the slide 50 has an opening 53 in which the rider 60 can freely move.

This ensures that, in the working position A, the camera arm 20 extends laterally away from the lateral surface 31 of the vehicle 30, and, in the position of rest R, it does not project upwardly from the roof surface 32 of the vehicle 30.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. An obstacle avoidance system for a camera arm configured to observe traffic to the rear of a vehicle, the vehicle having bodywork, the system comprising:
   the camera arm having a camera; and
   a guide rail arranged on an external surface of the vehicle and extending between an external lateral surface of the bodywork of the vehicle and an external roof surface of the bodywork of the vehicle, wherein the camera arm is arranged on the guide rail so as to be slidable along the guide rail back and forth between a position of rest on the roof surface and a working position on the lateral surface, wherein in the working position the camera arm and camera extend laterally outward from the external lateral surface of the bodywork and in the position of rest the camera arm does not extend vertically so that the camera arm and camera are substantially flat on the roof surface.

2. The obstacle avoidance system as claimed in claim 1, further comprising:

a slide connected to the camera arm and arranged on the guide rail so as to be slidable along the guide rail.

3. The obstacle avoidance system as claimed in claim 2, wherein:

the guide rail has a first guide rail and a control cam, and the first guide rail is configured to guide the camera arm along the guide, and the control cam is configured to control an alignment of the camera arm along the first guide rail.

4. The obstacle avoidance system as claimed in claim 3, wherein the slide has a bearing point on which the camera arm is rotatably mounted at a first connecting point of the camera arm.

5. An obstacle avoidance system for a camera arm configured to observe traffic to the rear of a vehicle, the vehicle having bodywork, the system comprising:

the camera arm having a camera; and a guide configured so as to extend from a lateral surface of the bodywork of the vehicle to a roof surface of the bodywork of the vehicle, wherein the camera arm is arranged on the guide so as to be slidable along the guide back and forth between a position of rest on the roof surface and a working position on the lateral surface, a slide connected to the camera arm and arranged on the guide so as to be slidable along the guide, the guide has a first guide rail and a control cam, and the first guide rail is configured to guide the camera arm along the guide, and the control cam is configured to control an alignment of the camera arm along the first guide rail, a rider arranged on the control cam, wherein the slide has a puller configured to connect the at least one rider to the camera arm at a second connecting point of the camera arm via a deflection point arranged on the slide, wherein the slide has a bearing point on which the camera arm is rotatably mounted at a first connecting point of the camera arm.

6. The obstacle avoidance system as claimed in claim 5, wherein the distance between the control cam and the vehicle varies over the length of the first guide rail.

7. The obstacle avoidance system as claimed in claim 6, wherein the slide has an opening in which the rider is movably arranged.

8. The obstacle avoidance system as claimed in claim 7, further comprising:

a stop having a latch, wherein, in the working position (A), the camera arm bears against the stop and is fastened to the stop by the latch.

9. The obstacle avoidance system as claimed in claim 1, further comprising:

at least one surroundings sensor configured to determine surroundings data which relate to the surroundings of the vehicle;

a drive device configured to move the slide along the guide rail; and a controller configured to control the drive device in accordance with the determined surroundings data so as to move the slide along the guide rail.

10. A vehicle having the obstacle avoidance system for a camera arm as claimed in claim 1.

* * * * *